US009932855B2

(12) United States Patent
Byrne (10) Patent No.: US 9,932,855 B2
(45) Date of Patent: *Apr. 3, 2018

(54) NACELLE COMPRESSION RODS (71) Applicant: ROHR, INC., Chula Vista, CA (US)

(72) Inventor: Stuart J. Byrne, San Diego, CA (US)

(73) Assignee: ROHR, INC., Chula Vista, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/267,547

(22) Filed: Sep. 16, 2016

(65) Prior Publication Data

US 2017/0002684 A1 Jan. 5, 2017

Related U.S. Application Data

(62) Division of application No. 14/329,600, filed on Jul. 11, 2014, now Pat. No. 9,470,107.

(51) Int. Cl.
| | |
|---|---|
| *B64D 29/06* | (2006.01) |
| *F01D 25/04* | (2006.01) |
| *F01D 25/26* | (2006.01) |
| *F16F 15/02* | (2006.01) |
| *B64D 33/00* | (2006.01) |
| *B64D 27/10* | (2006.01) |
| *F01D 25/28* | (2006.01) |

(52) U.S. Cl.
CPC ............ *F01D 25/04* (2013.01); *B64D 27/10* (2013.01); *B64D 29/06* (2013.01); *B64D 33/00* (2013.01); *F01D 25/265* (2013.01); *F16F 15/022* (2013.01); *F01D 25/28* (2013.01); *F05D 2220/323* (2013.01); *F05D 2240/14* (2013.01)

(58) Field of Classification Search
CPC ...................................................... B64D 29/06
See application file for complete search history.

(56) References Cited

U.S. PATENT DOCUMENTS

| | | | | |
|---|---|---|---|---|
| 4,440,068 | A | * | 4/1984 | Tootle ................... B64D 29/08 92/113 |
| 8,615,846 | B2 | | 12/2013 | Wheeler et al. |
| 2011/0038725 | A1 | | 2/2011 | Soulier et al. |
| 2012/0125010 | A1 | * | 5/2012 | Michael .................... B64C 7/02 60/782 |
| 2016/0010502 | A1 | | 1/2016 | Byrne |

OTHER PUBLICATIONS

USPTO; Restriction Requirement dated Dec. 23, 2015 in U.S. Appl. No. 14/329,600.
USPTO; Pre-Interview First Office Action dated Sep. 9, 2016 in U.S. Appl. No. 14/329,600.
USPTO; Notice of Allowance dated Jun. 16, 2016 in U.S. Appl. No. 14/329,600.

* cited by examiner

*Primary Examiner* — Jessica B Wong
(74) *Attorney, Agent, or Firm* — Snell & Wilmer, L.L.P.

(57) ABSTRACT

A compression rod may include a plunger and a spring. A proximal end and a distal end of the compression rod may contact engagement features in a core cowl of a gas turbine engine. The compression rod may transmit loads between halves of the core cowl. The spring may cause the plunger to extend and contract in response to vibrations or other relative movement between halves of the core cowl.

5 Claims, 9 Drawing Sheets

NACELLE COMPRESSION RODS

CROSS REFERENCE TO RELATED APPLICATIONS

The present application is a divisional of, and claims priority to, U.S. application Ser. No. 14/329,600 entitled "NACELLE COMPRESSION RODS" and filed on Jul. 11, 2014, the contents of which are incorporated by reference herein in their entirety.

FIELD

The disclosure generally relates to gas turbine engines. More particularly, the disclosure relates to a compression rod for a thrust reverser in a gas turbine engine.

BACKGROUND

Modern aircraft may utilize one or more gas turbine engines. A gas turbine engine may be housed in a nacelle. Often, the nacelle includes a thrust reverser. The thrust reverser includes an inner fixed structure (IFS) surrounding the engine which forms the interior surface of a bypass air duct through the thrust reverser. The IFS defines a core compartment that surrounds the engine. During various operating conditions, such as during reverse thrust, pressure in the duct is greater than the pressure in the core compartment around the engine. In these conditions, two IFS halves may be pushed together, and a nacelle component may react the load between the two IFS halves. In certain cases, the load may be reacted with a compression rod that extends between the two IFS halves.

SUMMARY

An aircraft nacelle is disclosed. The aircraft nacelle may comprise a first half comprising a first engagement feature, and a second half comprising a second engagement feature. The first half and the second half may be rotatable about a hinge between a closed position in which the first half and the second half enclose a portion of an aircraft engine, and an open position in which the first half and the second half are separated and allow access to the portion of the aircraft engine. The aircraft nacelle may comprise a compression rod. The compression rod may comprise a proximal end and a distal end. In response to the aircraft nacelle being in the closed position, the proximal end may be in contact with the first engagement feature, and the distal end may be in contact with the second engagement feature. The compression rod may comprise a spring configured to bias the proximal end apart from the distal end. In response to the aircraft nacelle being in the closed position, the spring may be in a compressed position.

In various embodiments, the compression rod may comprise a plunger. The compression rod may comprise a compression tube. The compression tube may comprise a plunger bore. The spring may be located within the plunger bore. The compression tube may comprise a threaded bore. The proximal end may comprise a threaded shaft located within the threaded bore. The aircraft nacelle may comprise a pylon bracket. The compression rod may be located within the pylon bracket. The first engagement feature may comprise a first cone coupled to a first half of a core cowl, and the second engagement feature may comprise a second cone coupled to a second half of the core cowl.

A compression rod for an aircraft is disclosed. The compression rod may comprise a proximal end comprising a first engagement member, a distal end comprising a second engagement member, and a compression tube between the proximal end and the distal end. The compression tube may comprise a spring. The compression rod may be configured to transfer a load in a core cowl of the aircraft.

In various embodiments, the compression tube may define a plunger bore. The second engagement member may comprise a plunger shaft located within the plunger bore. The compression tube may define a retaining slot. The second engagement member may comprise a retaining pin located within the retaining slot. The first engagement member may comprise a button end. The compression rod may comprise a plunger stop in contact with a first end of the compression tube. The spring may be configured to cause the first engagement member to be in contact with a first engagement feature of a core cowl, and the second engagement member to be in contact with a second engagement feature of the core cowl.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods for compression rods are disclosed in accordance with various embodiments. A compression rod may comprise a plunger and a spring. A proximal end and a distal end of the compression rod may contact engagement features in a core cowl of a gas turbine engine. The compression rod may transmit loads between halves of the core cowl. The spring may cause the plunger to extend and contract in response to vibrations or other relative movement between halves of the core cowl. The movement of the plunger may allow the compression rod to tend to maintain contact with the engagement features and decrease wear associated with vibration between the compression rod and engagement features.

Figure 1:
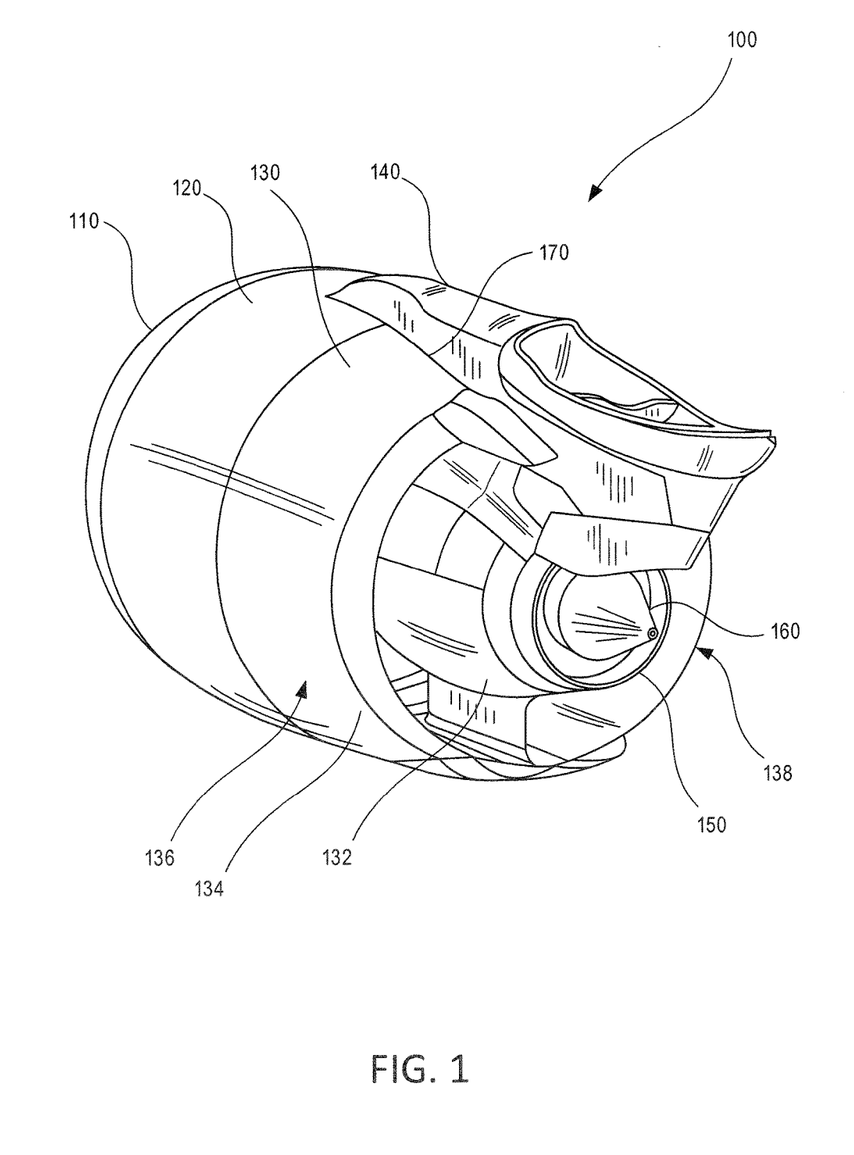
FIG. 1 illustrates a perspective view of a nacelle in accordance with various embodiments of the disclosure.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140, which may mount the nacelle 100 to an aircraft wing or aircraft body. Thrust reverser 130 may comprise an inner fixed structure ("IFS") 132 and an outer fixed structure ("OFS") 134. Bypass air from an engine fan may flow between the IFS 132 and the OFS 134. The thrust reverser 130 may be coupled to a core cowl 150 which surrounds a nozzle 160. The thrust reverser 130 may further be split into a left half 136 and a right half 138. The left half 136 and the right half 138 may be hinged to the pylon 140 at hinges 170. The left half 136 and the right half 138 may hinge open at hinges 170 in order to provide access to the engine.

Figure 2:
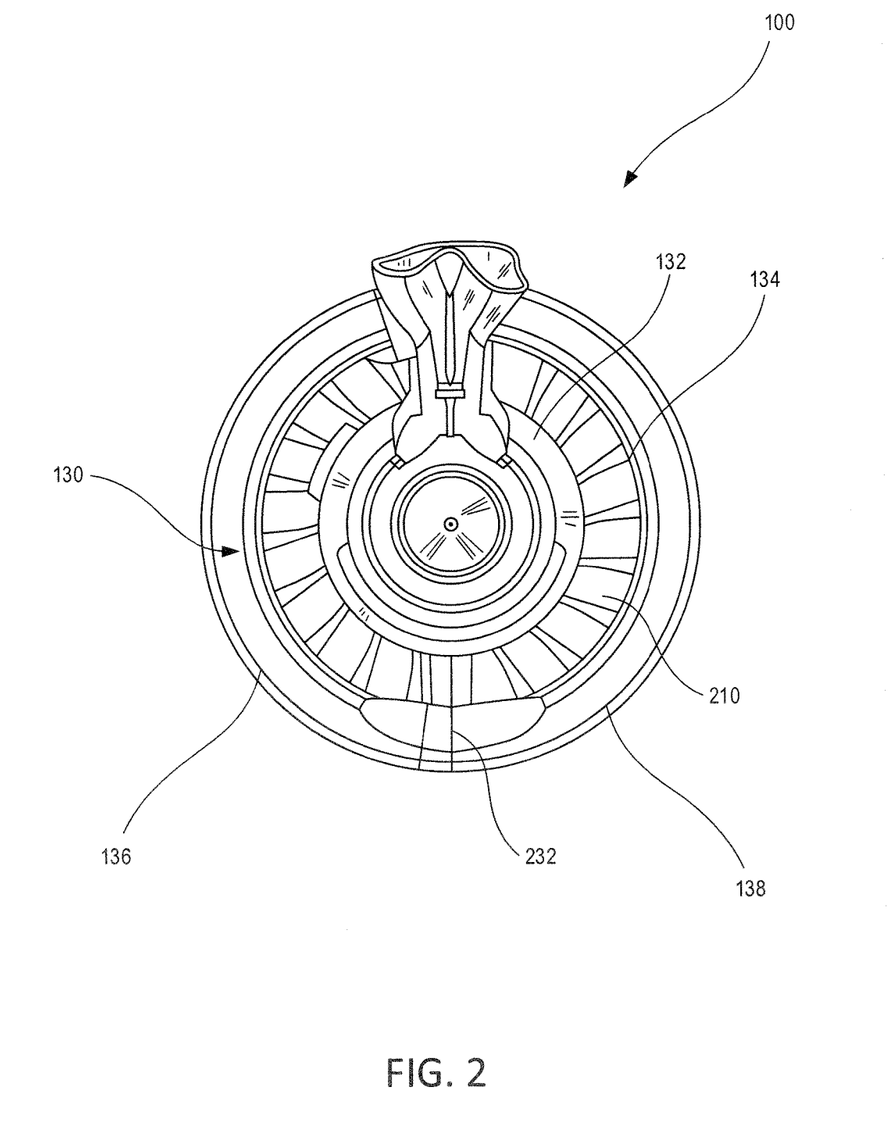
FIG. 2 illustrates an aft view of a nacelle in a closed position in accordance with various embodiments of the disclosure.

Referring to FIG. 2, an aft view of nacelle 100 in a closed position is illustrated according to various embodiments. Left half 136 and right half 138 of thrust reverser 130 may be split along split line 232. Engine fan 210 is visible between IFS 132 and OFS 134.

Figure 3:
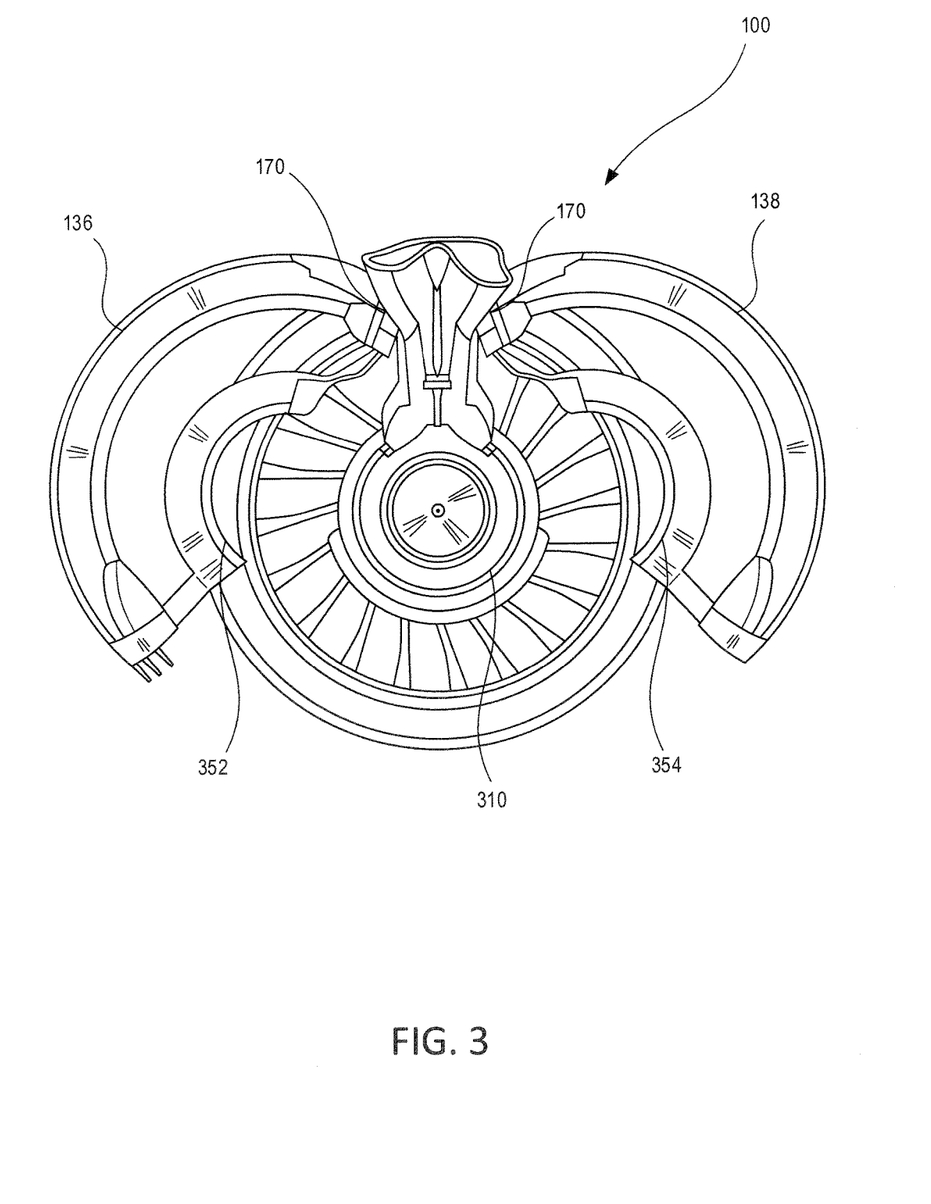
FIG. 3 illustrates an aft view of a nacelle in an open position in accordance with various embodiments of the disclosure.

Referring to FIG. 3, an aft view of nacelle 100 with the thrust reverser halves 136, 138 hinged open is illustrated according to various embodiments. Thrust reverser halves 136, 138 and core cowl halves 352, 354 are hinged open at hinges 170 in order to provide access to engine 310.

Figure 4:
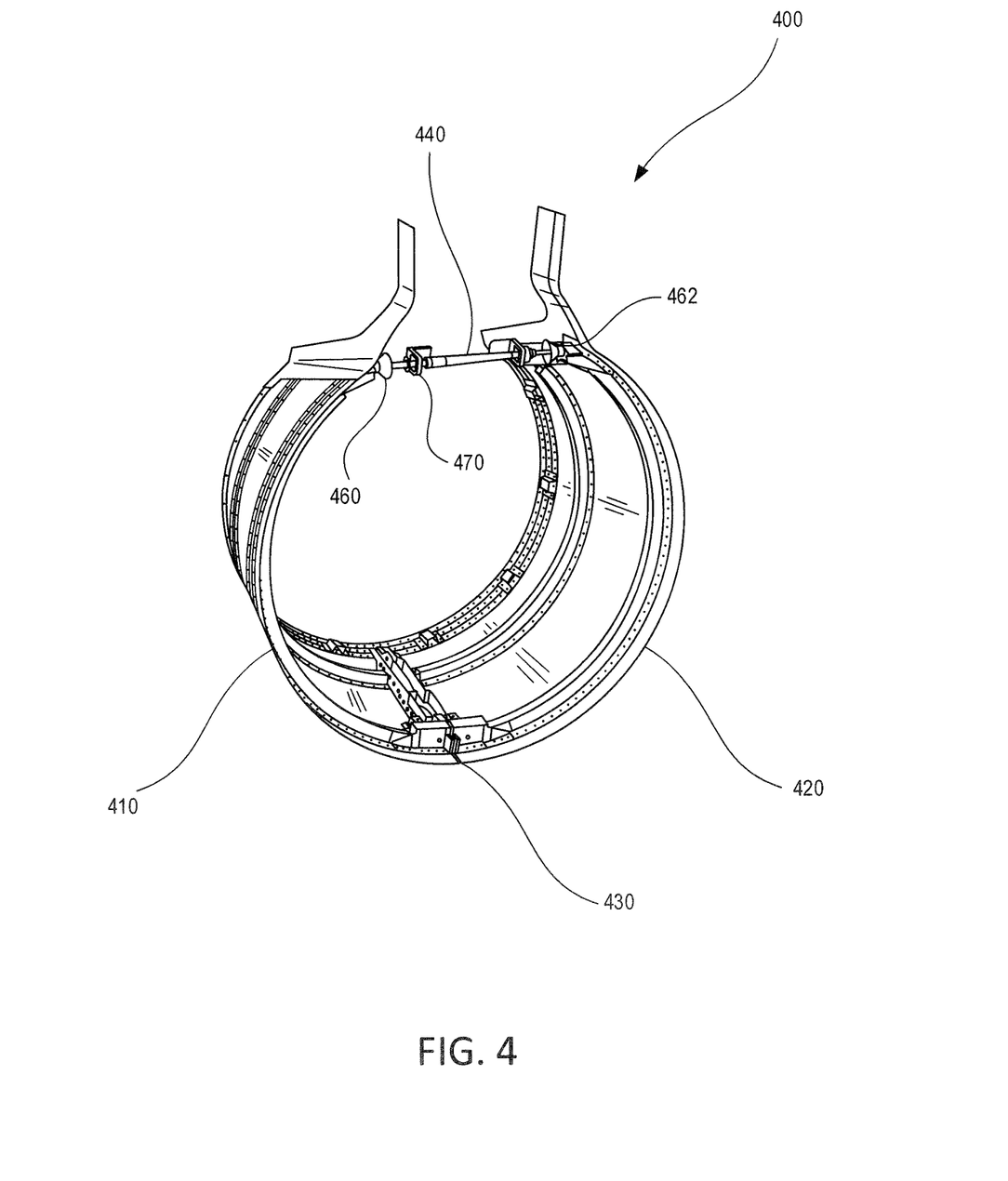
FIG. 4 illustrates a perspective view of a core cowl in accordance with various embodiments of the disclosure.

Referring to FIG. 4, a perspective view of a core cowl 400 is illustrated according to various embodiments. A left half 410 and a right half 420 of core cowl 400 may be split along split line 430. A compression rod 440 may be configured to transmit loads between left half 410 and right half 420. The compression rod 440 may be mounted within pylon brackets 470. The pylon brackets 470 may be coupled to the pylon. The compression rod 440 may contact left half 410 and right half 420 at engagement features 460, 462. In various embodiments, engagement features 460, 462 may be engagement cones. Engagement features 460, 462 may be coupled respectively to left half 410 and right half 420.

In response to left half 410 and right half 420 of core cowl 400 hinging open, compression rod 440 may disengage from engagement features 460, 462. Compression rod 440 may be retained by mounting brackets 470. In various embodiments, one or more compression rods 440 may be located at any spot in a thrust reverser and may transmit loads between halves of the thrust reverser.

Figure 5:
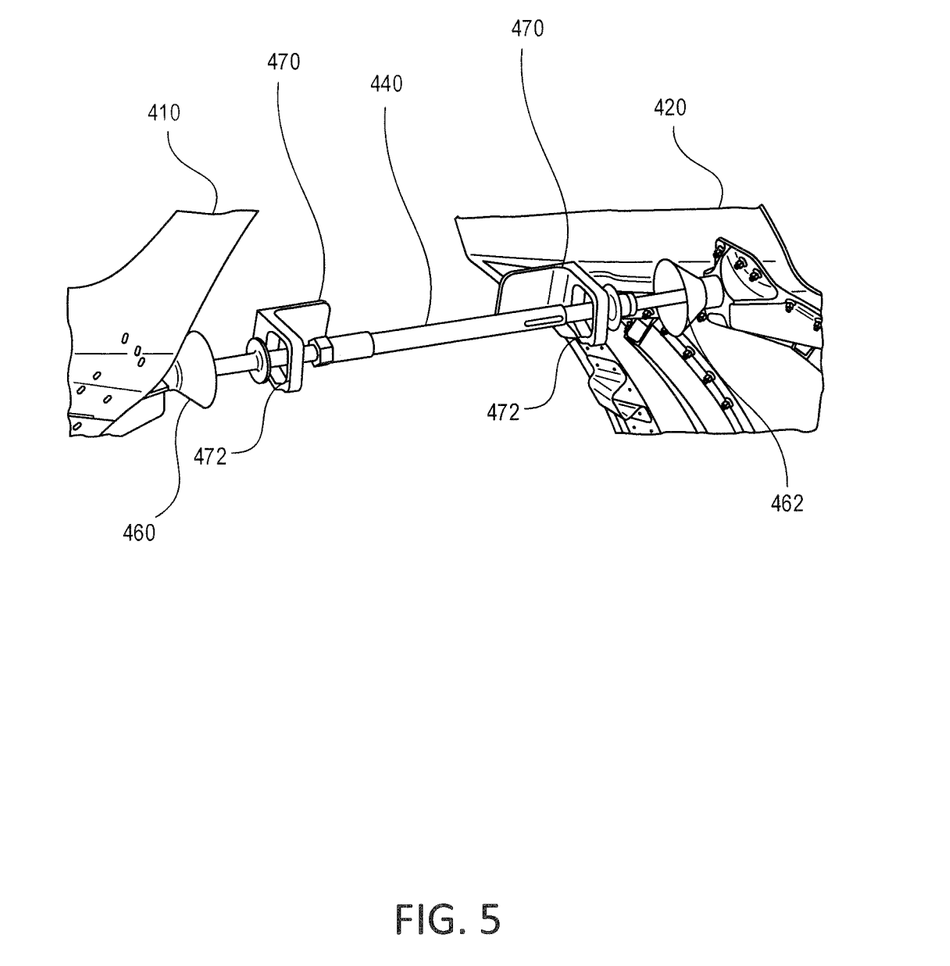
FIG. 5 illustrates a perspective view of a compression rod in accordance with various embodiments of the disclosure.

Referring to FIG. 5, a perspective view of compression rod 440 is illustrated according to various embodiments. Mounting brackets 470 may comprise apertures 472 which are larger in diameter than compression rod 440, which may allow movement of compression rod 440 within mounting brackets 470. In response to left half 410 and right half 420 hinging closed, compression rod 440 may engage engagement features 460, 462.

Figure 6A:
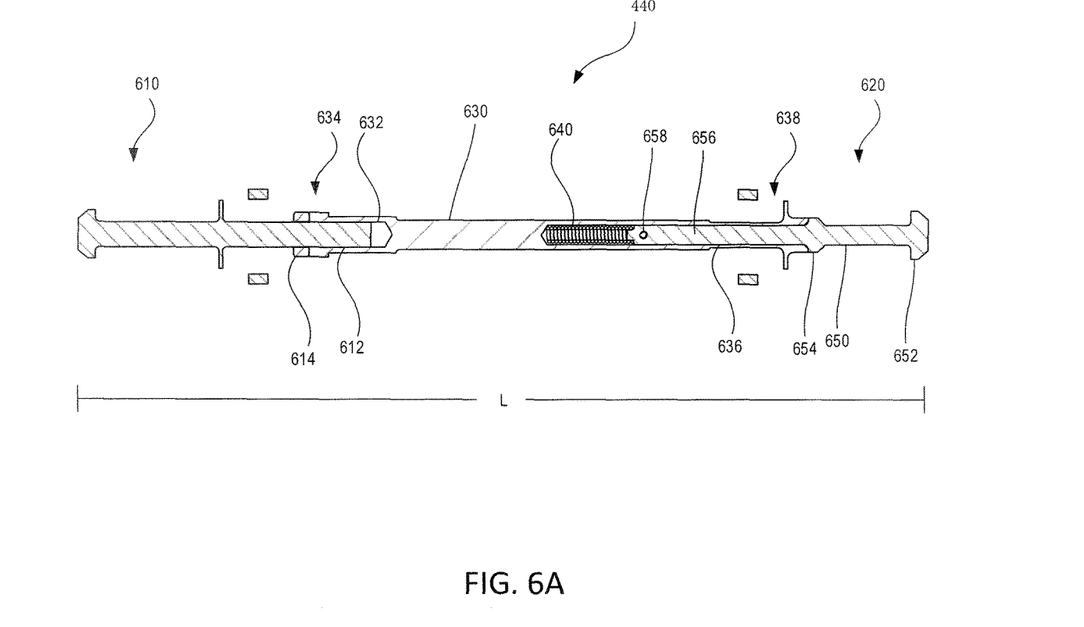
FIG. 6A illustrates a cross-section view of a compression rod in accordance with various embodiments of the disclosure.

Referring to FIG. 6A, a cross-section view of a compression rod 440 is illustrated according to various embodiments. Compression rod 440 may comprise a proximal end 610 and a distal end 620, and a compression tube 630. A threaded shaft 612 may be located within a threaded bore 632 in a first end 634 of compression tube 630. Threaded shaft 612 may be rotated within threaded bore 632 in order to adjust a length L of compression rod 440. A lock nut 614 may tighten against a first end 634 of compression tube 630 in order to fix the length L of compression rod 440.

Compression tube 630 may define a plunger bore 636 at a second end 638 of compression tube 630. Plunger bore 636 may comprise a spring 640. In various embodiments, spring 640 may be a metal coil spring. However, in various embodiments, spring 640 may comprise a compressed gas, a fluid, or any combination of physical, pneumatic, and hydraulic components. A plunger 650 at distal end 620 may comprise an engagement member 652, a plunger stop 654, a plunger shaft 656, and a retaining pin 658. Plunger shaft 656 may be located within plunger bore 636. Plunger shaft may contact spring 640. As illustrated, spring 640 is compressed and exerts a force on plunger shaft 656 in a direction opposite of proximal end 610. Thus, spring 640 may cause plunger 650 to extend away from proximal end 610, and the length L of compression rod 440 to increase in the absence of an external force, such as a force from an engagement feature on a core cowl. Plunger stop 654 may contact second end 638 of compression tube 630 and prevent compression of compression rod 440. As illustrated, plunger stop 654 contacts second end 638, and compression rod 440 is in a maximum compressed position.

Figure 6B:
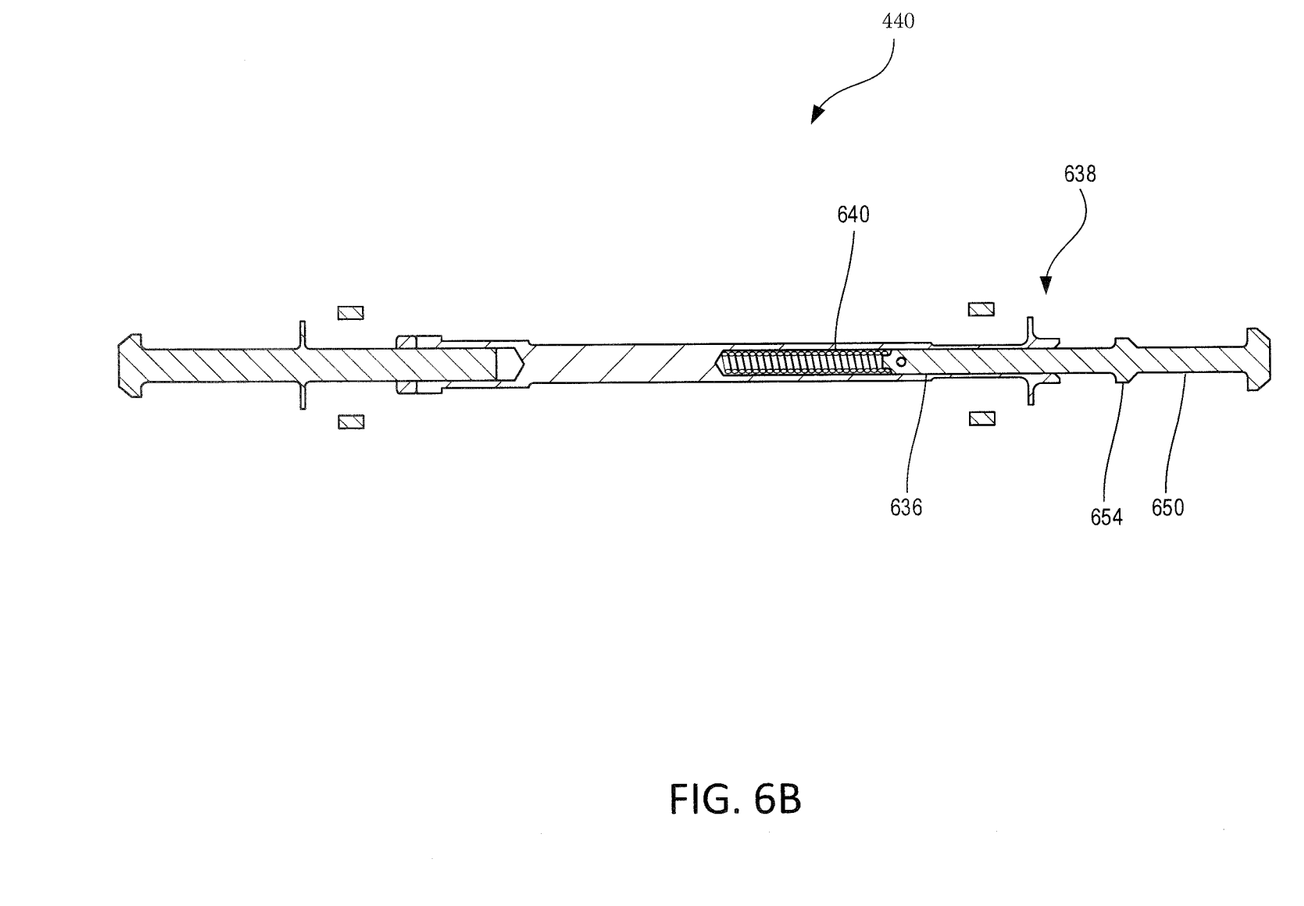
FIG. 6B illustrates a cross-section view of a compression rod in an extended position in accordance with various embodiments of the disclosure.

Referring to FIG. 6B, a cross-section view of compression rod 440 in an extended position is illustrated according to various embodiments. In the extended position, spring 640 may force plunger 650 at least partially out of plunger bore 636. Plunger stop 654 may be separated from second end 638 of compression rod 440.

Figure 7:
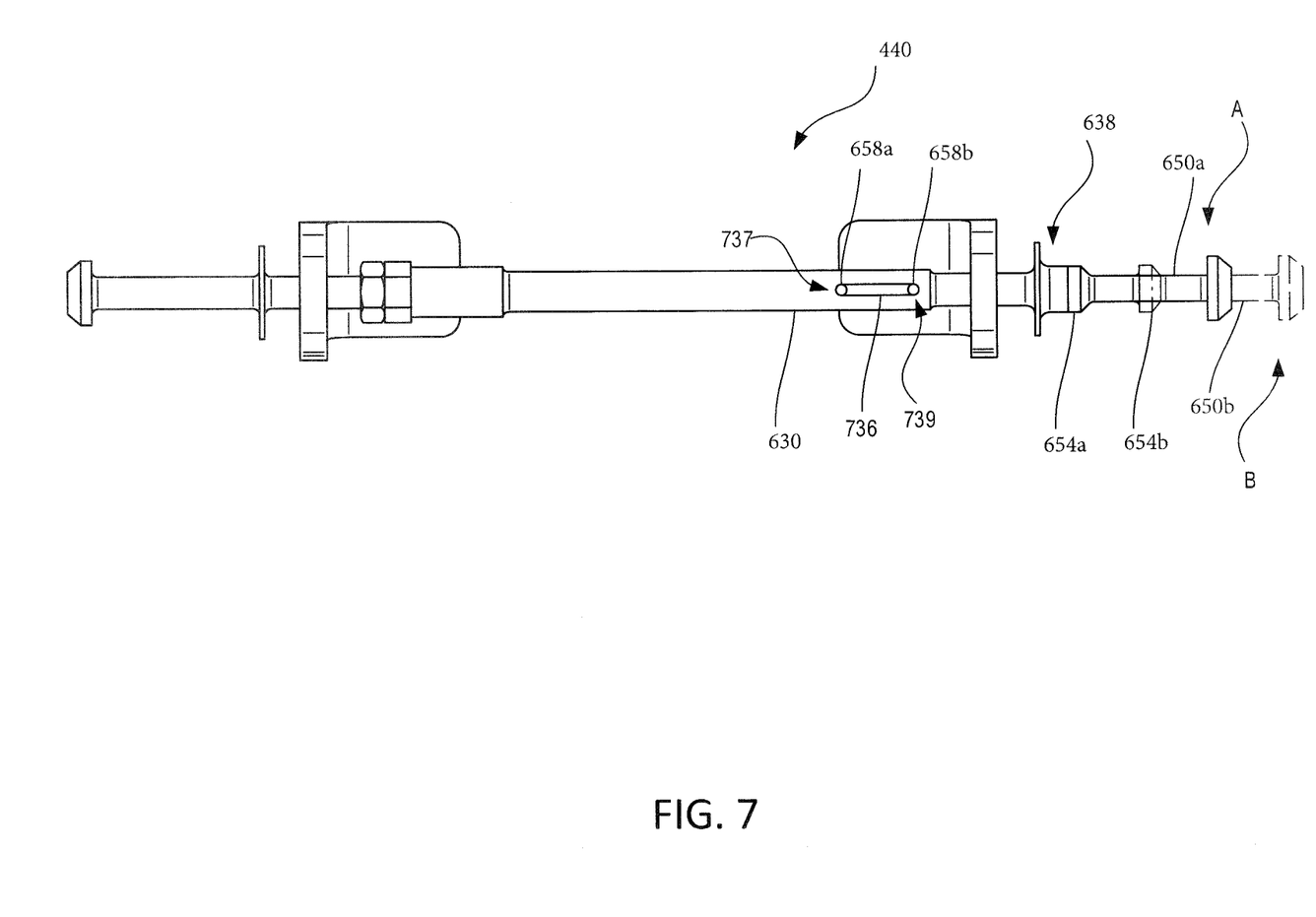
FIG. 7 illustrates an aft view of a compression rod in accordance with various embodiments of the disclosure.

Referring to FIG. 7, a compression rod 440 is illustrated at multiple positions. At a compressed position A, plunger stop 654a of plunger 650a may contact second end 638 of compression tube 630. Compression tube 630 may comprise a retaining pin slot 736. At compressed position A, retaining pin 658a may contact a first end 737 of retaining pin slot 736. At an extended position B, plunger stop 654b may separate from second end 638 of compression tube 630. At extended position B, retaining pin 658b may contact a second end 739 of retaining pin slot 736. Retaining pin 658b may prevent further extension of plunger 650b.

Figure 8:
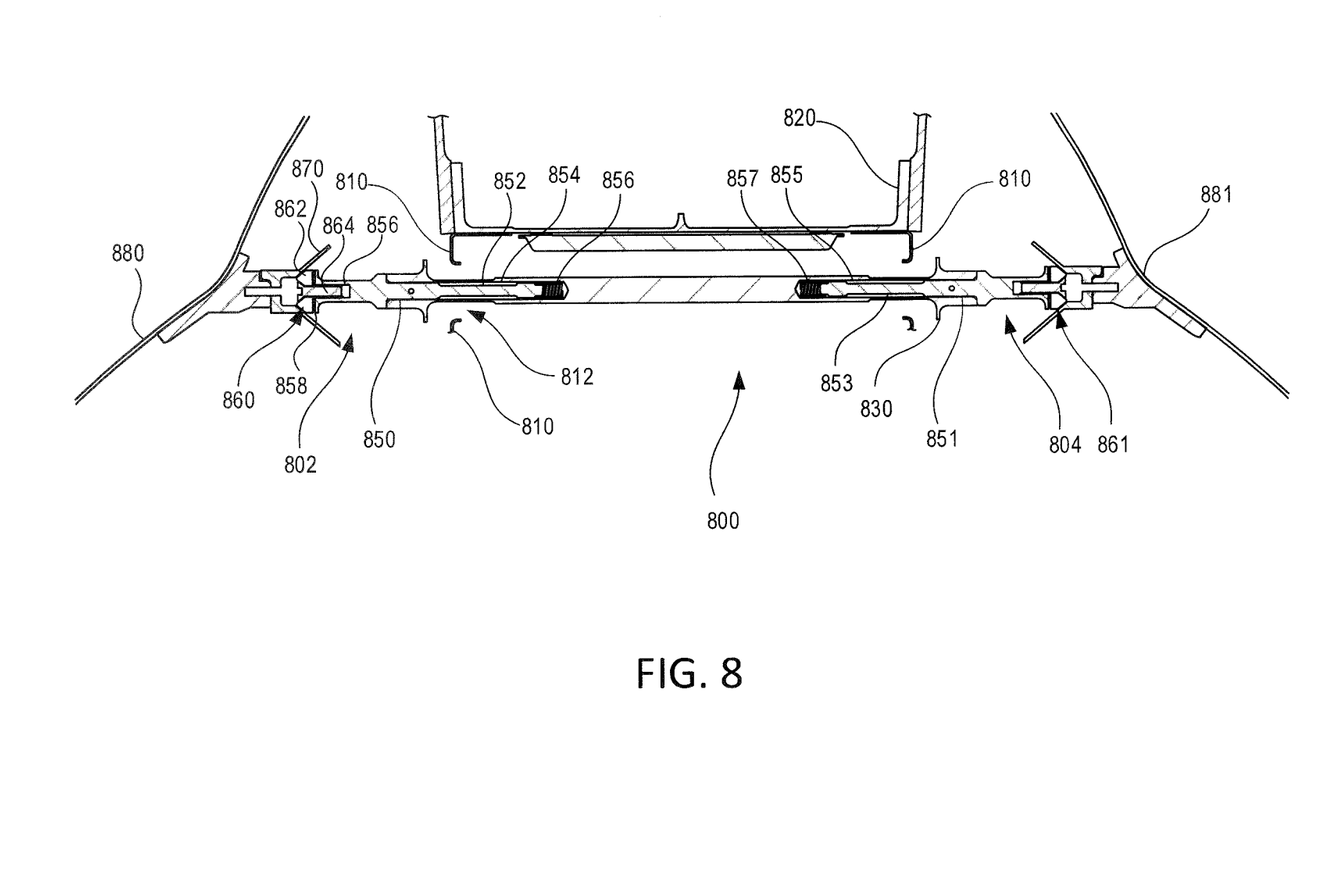
FIG. 8 illustrates a cross-section view of a compression rod having two plungers in accordance with various embodiments.

Referring to FIG. 8, a cross-section of a compression rod 800 having a first plunger 850 and a second plunger 851 is illustrated according to various embodiments. Compression rod 800 may be mounted within pylon brackets 810, which may be coupled to pylon 820. Retaining rings 830 may prevent compression rod 800 from translating through apertures 812 in pylon brackets 810. First plunger 850 may be located at a proximal end 802 of compression rod 800, and second plunger 851 may be located at a distal end 804 of compression rod 800. First plunger 850 and second plunger 851 may comprise respective plunger shafts 852, 853, which may be located within plunger bores 854, 855. Springs 856, 857 may be located within plunger bores 854, 855.

In various embodiments, compression rod 800 may comprise one or more button ends 860, 861. Button ends 860, 861 may comprise a head 862, and threaded button shaft 864. Threaded button shaft 864 may engage threads in button bore 856 in first plunger 850 and second plunger 851. One or more shims 858 may be inserted between head 862 and plunger 850 in order to adjust a length of compression rod 800. Button ends 860, 861 may engage respective engagement features 870, 871 in left half 880 and right half 881 of a core cowl.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A compression rod for an aircraft comprising:
   a proximal end comprising a first engagement member comprising a threaded shaft;
   a distal end comprising a second engagement member; and
   a compression tube between the proximal end and the distal end, the compression tube comprising a spring,
   wherein the threaded shaft is located within a threaded bore in a first end of the compression tube,
   wherein the spring is located within a plunger bore in a second end of the compression tube,
   wherein the compression rod is configured to transfer a load in a core cowl of the aircraft,
   wherein the first engagement member is configured to disengage from a first engagement feature on a first half of the core cowl in response to the first half of the core cowl opening, and
   wherein the second engagement member is configured to disengage from a second engagement feature on a second half of the core cowl in response to the second half of the core cowl opening.

2. The compression rod of claim 1, wherein the second engagement member comprises a plunger shaft located within the plunger bore.

3. The compression rod of claim 1, wherein the compression tube defines a retaining slot, and wherein the second engagement member comprises a retaining pin located within the retaining slot.

4. The compression rod of claim 1, further comprising a plunger stop in contact with the second end of the compression tube.

5. The compression rod of claim 1, wherein when the core cowl is in a closed position, the spring is configured to cause the first engagement member to be in contact with the first engagement feature of the core cowl and the second engagement member to be in contact with the second engagement feature of the core cowl.

* * * * *